(12) United States Patent
Boue et al.

(10) Patent No.: US 12,417,346 B2
(45) Date of Patent: Sep. 16, 2025

(54) METHOD AND SYSTEM TO EXTRACT DATA DEPENDENCIES FOR MACHINE LEARNING MODELS

(71) Applicant: Microsoft Technology Licensing, LLC, Redmond, WA (US)

(72) Inventors: Laurent Boue, Petah Tikva (IL); Kiran Rama, Bangalore (IN); Vijay Srinivas Agneeswaran, Bangalore (IN); Chepuri Shri Krishna, Bangalore (IN); Swarnim Narayan, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 616 days.

(21) Appl. No.: 17/738,851

(22) Filed: May 6, 2022

(65) Prior Publication Data
US 2023/0359822 A1    Nov. 9, 2023

(51) Int. Cl.
*G06F 40/284* (2020.01)
*G06F 40/211* (2020.01)
*G06N 5/022* (2023.01)
*G08B 21/18* (2006.01)

(52) U.S. Cl.
CPC .......... *G06F 40/284* (2020.01); *G06F 40/211* (2020.01); *G06N 5/022* (2013.01); *G08B 21/18* (2013.01)

(58) Field of Classification Search
CPC ...... G06F 40/284; G06F 40/211; G06N 5/022
USPC ................................................. 704/231, 251
See application file for complete search history.

(56) References Cited

U.S. PATENT DOCUMENTS

| 10,713,589 B1 * | 7/2020 | Zarandioon ............ G06N 20/00 |
| 2020/0175423 A1 * | 6/2020 | Keech ...................... G06F 8/436 |
| 2021/0216905 A1 | 7/2021 | Floratou et al. |
| 2022/0035605 A1 | 2/2022 | Ibarra Von Borstel et al. |

FOREIGN PATENT DOCUMENTS

WO    2021160242 A1    8/2021

OTHER PUBLICATIONS

"International Search Report and Written Opinion Issued in PCT Application No. PCT/US23/013562", Mailed Date: Jul. 3, 2023, 12 Pages.

* cited by examiner

*Primary Examiner* — George C Monikang
(74) *Attorney, Agent, or Firm* — ArentFox Schiff LLP

(57) ABSTRACT

Example aspects include techniques for anomaly detection via sparse judgmental samples. These techniques may include generating, via lexical analysis, a plurality of tokens from a textual representation of a machine learning (ML) model and generating, via a parser, based on the plurality of tokens, an abstract syntax tree (AST) corresponding to the ML model. In addition, the techniques may include identifying a data dependency of the ML model based on an AST node within the AST, the AST node corresponding to a data source and the data dependency indicating the ML model depends on the data source. Further, the techniques may include detecting a potential issue associated with the data source, and transmitting, based on the data dependency, an alert notification in response to the potential issue.

20 Claims, 6 Drawing Sheets

METHOD AND SYSTEM TO EXTRACT DATA DEPENDENCIES FOR MACHINE LEARNING MODELS

BACKGROUND

Organizations of every size depend on Machine Learning (ML) for critical decision-making ranging from credit/lending decisions, customer identification, business insight identification, fraud detection, and anomaly prevention and detection. Much of modern ML risk derives from the data dependencies of the ML models. For example, data source information provided upstream to train a ML model may become outdated and negatively impact the performance of downstream consumers of the ML model. Accordingly, organizations must be able to quickly respond to data source changes that can impact ML models. However, in many production systems, it can be extremely difficult to manage and track the data dependencies of ML models.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a method including: generating, via lexical analysis, a plurality of tokens from a textual representation of a machine learning (ML) model; generating, via a parser, based on the plurality of tokens, an abstract syntax tree (AST) corresponding to the ML model; identifying a data dependency of the ML model based on an AST node within the AST, the AST node corresponding to a data source and the data dependency indicating the ML model depends on the data source; detecting a potential issue associated with the data source; and transmitting, based on the data dependency, an alert notification in response to the potential issue.

In some aspects, the techniques described herein relate to a non-transitory computer-readable device having instructions thereon that, when executed by at least one computing device, cause the at least one computing device to perform operations including: generating, via lexical analysis, a plurality of tokens from a textual representation of a machine learning (ML) model; generating, via a parser, based on the plurality of tokens, an abstract syntax tree (AST) corresponding to the ML model; identifying a data dependency of the ML model based on an AST node within the AST, the AST node corresponding to a data source and the data dependency indicating the ML model depends on the data source; detecting a potential issue associated with the data source; and transmitting, based on the data dependency, an alert notification in response to the potential issue.

In some aspects, the techniques described herein relate to a system including: a memory storing instructions thereon; and at least one processor coupled with the memory and configured by the instructions to: generate, via lexical analysis, a plurality of tokens from a textual representation of a machine learning (ML) model; generate, via a parser, based on the plurality of tokens, an abstract syntax tree (AST) corresponding to the ML model; identify a data dependency of the ML model based on an AST node within the AST, the AST node corresponding to a data source and the data dependency indicating the ML model depends on the data source; and presenting, via a graphical user interface, the data dependency.

In another aspect, an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for extracting data dependencies of ML models. In particular, aspects of the present disclosure provide a dependency extractor configured to generate an abstract syntax tree for a ML model, and identify the data dependencies of the ML model based on the abstract syntax tree. Many systems employ ML models for a multitude of use cases. Traditional software engineering practice has shown that strong abstraction boundaries using encapsulation and modular design help create maintainable code in which it is easy to make isolated changes and improvements. Unfortunately, it is difficult to enforce strict abstraction boundaries for ML systems by prescribing specific intended behavior. Instead, ML is often used in cases where the desired behavior cannot be effectively expressed in software logic without dependency on external data. Further, data dependencies in ML systems add significant technical debt and instability while also being difficult to detect. For example, external data may drift and cause model performance degradation over time. As another example, ML models may have circular and/or otherwise nebulous dependencies that are difficult to identify. Further, modern solutions for identifying and managing ML data dependencies have proven inefficient, non-performant, cumbersome, language specific, and fail to vertically scale. For example, some systems administrators have implemented dependency detection based on regular expressions (regex), which is not language agnostic and struggles to identify more complex data dependencies (e.g., transitive dependencies, circular dependencies, etc.). Accordingly, the present techniques detect data dependencies of a ML model based on an AST representation of the ML model in a language agnostic and performant process.

Illustrative Environment

Figure 1:
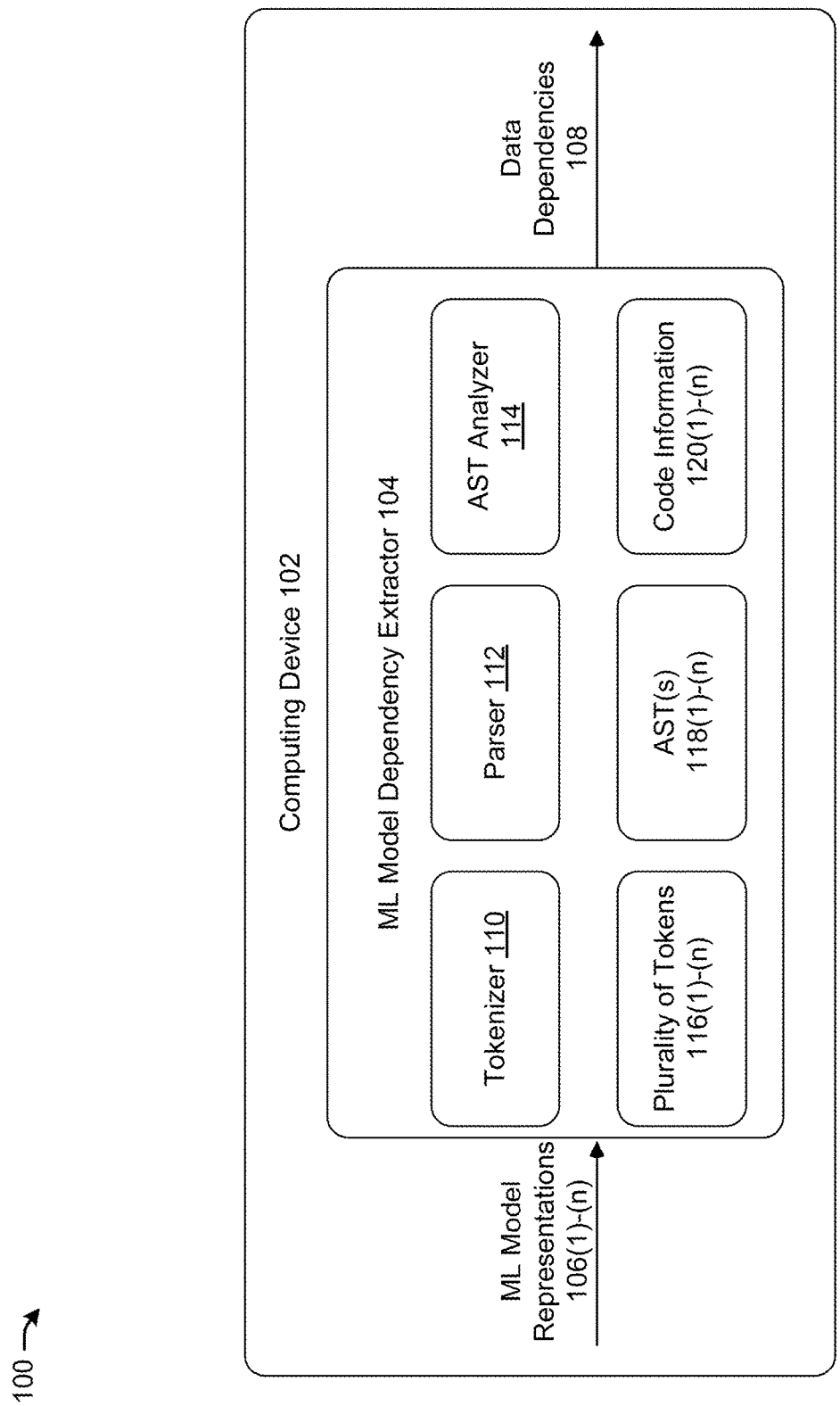
FIG. 1 illustrates an example architecture of a ML model dependency extractor, in accordance with some aspects of the present disclosure.

FIG. 1 is a diagram showing an example architecture of a ML model dependency extractor, in accordance with some aspects of the present disclosure.

As illustrated in FIG. 1, a computing device 100 may include a ML model dependency extractor 104 configured to receive ML model representations 106(1)-(n) of a plurality of ML models and determine the data dependencies 108(1)-(n) of the plurality of ML models. For example, the ML model dependency extractor 104 may receive a ML model representation 106(1) of a ML model configured to detect fraudulent customer activity at an e-commerce website. As used herein, in some aspects, a ML model may refer to a file that has been trained to recognize certain types of patterns within an application or a script. The ML model representation 106(1) may be a textual representation of the ML model, e.g., a JavaScript Object Notation (JSON) file including a serialization of the ML model. Further, the ML model representation may include source code in a programming language (kusto query language (KQL), structured query language (SQL), Python, Python AML, and so forth). Some examples of the computing device 102 include desktops, smartphone devices, Internet of Things (IoT) devices, unmanned aerial vehicles (UAVs), robots, process automation equipment, sensors, control devices, vehicles, transportation equipment, tactile interaction equipment, virtual and augmented reality (VR and AR) devices, industrial machines, etc.

As illustrated in FIG. 1, the ML model dependency extractor 104 may include a tokenizer 110 (e.g., a lexer), a parser 112, and an abstract syntax tree (AST) analyzer 114. In some aspects, the tokenizer 110 may be configured to perform lexical analysis on the ML model representations 106(1)-(n). For instance, the tokenizer 110 may be configured to determine a plurality of tokens 116(1)-(n) from the ML model representations 106(1)-(n). As an example, the tokenizer 110 may generate a plurality of tokens 116(1)-(200) by performing lexical analysis on the ML model representation 106(1). In some aspects, each individual token of the plurality of tokens 116(1)-(n) may be an atomic unit in the language syntax.

The parser 112 may be configured to perform syntax analysis on the plurality of tokens 116(1)-(n) to generate ASTs 118(1)-(n). As used herein, in some aspects, an AST may refer to a tree representation of the abstract syntactic structure of source code. For example, the parser 112 may parse the plurality of tokens 116(1)-(n) associated with the ML model representation 106(1), and generate an AST 118(1) representing the syntactical structure of the ML model represented by the ML model representation 106(1). In some aspects, an AST 118 may be built according to the formal grammar rules of the language used to code the ML model represented by the corresponding ML model representation 106. Further, use of an AST 118 introduces a degree of language agnosticism as the tokenizer 110 and the parser 112 may be applied to any language.

The AST analyzer 114 may be configured to identify the data dependencies 108(1)-(n) of the ML models represented by a ML model representations 106(1)-(n) based on code information 120(1)-(n). For example, the AST analyzer 114 may traverse the AST 118(1) to a node of the AST 118(1), and determine whether the node corresponds to a data dependency based on the code information 120(1) defining one or more node types that correspond to use of a data source in the programming language used to code the ML model represented by the ML model representation 106(1). Further, the tree structure of the AST 118 reduces the difficulty of identifying complex dependencies (e.g., circular dependencies, transitive dependencies, etc.) as the AST analyzer 114 can identify relationships and dependencies by traversing the AST 118(1).

Figure 2:
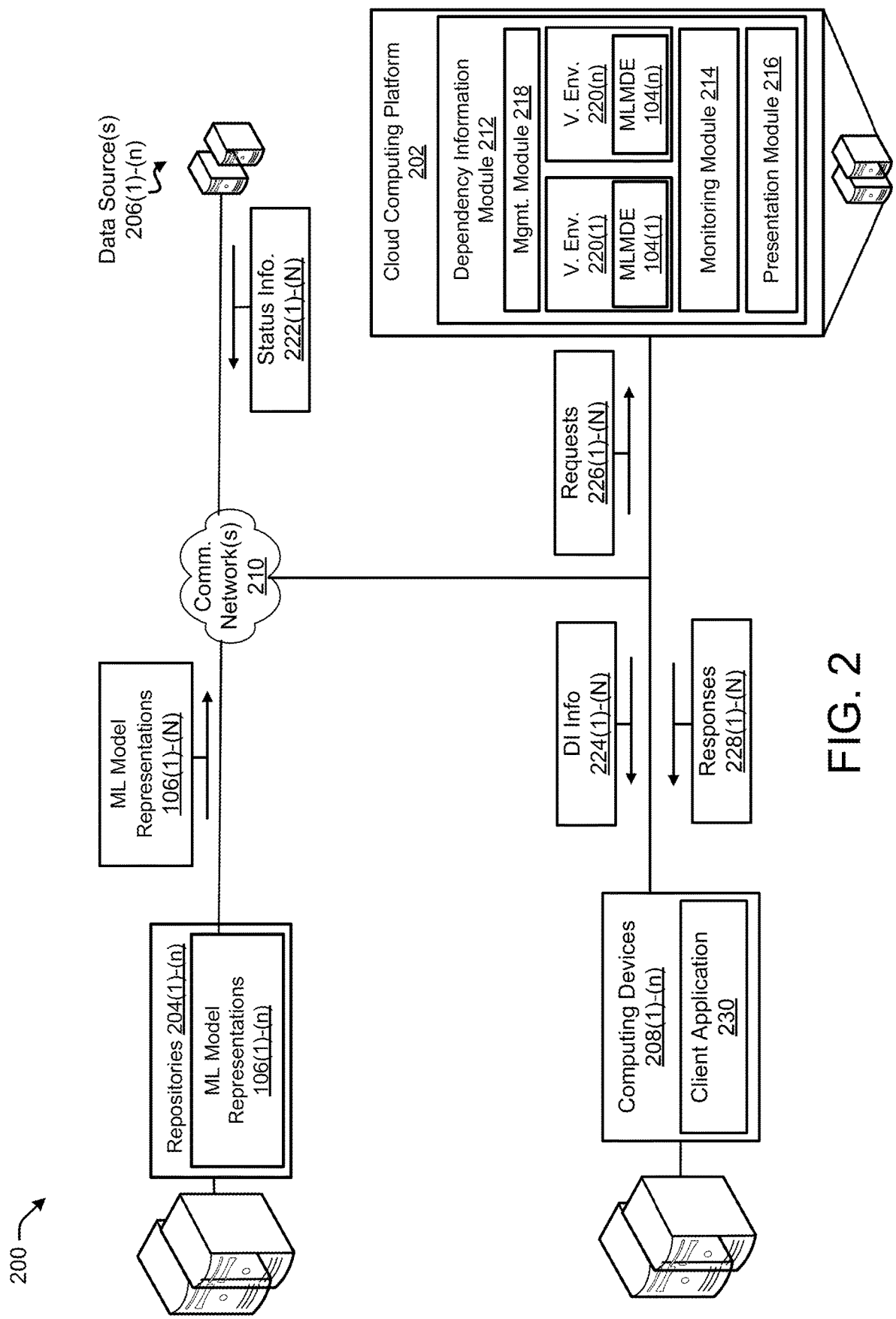
FIG. 2 is a diagram illustrating an example environment for ML Model dependency management, in accordance with some aspects of the present disclosure.

As described in detail with respect to FIG. 2, once the AST analyzer 114 determines the one or more data dependencies 108 of a ML model representation 106, the ML model dependency extractor 104 may generate a document listing the one or more data dependencies 108 and transmit and/or present the document to a device associated with the ML model represented by the ML model representation 106. Additionally, or alternatively, in some aspects, once the AST analyzer 114 determines the one or more data dependencies 108 for a ML model representation 106, the one or more data dependencies 108 may be used by a monitoring module 214 to track the health of the ML model represented by the ML model representation 106.

FIG. 2 is a diagram illustrating an example environment for ML Model dependency management, in accordance with some aspects of the present disclosure. As illustrated in FIG. 2, the ML model dependency management system 200 may include a cloud computing platform 202, one or more repositories 204(1)-(n), one or more data sources 206(1)-(n) (e.g., database management systems, databases, files (csv, spreadsheets, documents), and so forth), and one or more computing devices 208(1)-(n). Further, the ML model dependency management system 200 may include one or more communication networks 210. Some examples of the one or more communication networks 210 include cellular networks, wireless networks, local area networks (LANs), wide area networks (WANs), personal area networks (PANs), the Internet, or any other type of network configured to communicate information between the cloud computing platform 202, the one or more repositories 204, the one or more data sources 206, and the one or more computing devices 208.

The cloud computing platform 202 may include one or more computing devices that provide other computing devices with distributed storage and access to software, services, files, and/or data via the one or more network(s) 210. For example, the cloud computing platform 202 may provide ML model dependency management as a service to the one or more computing devices 208 via the dependency information module 212.

The dependency information module 212 may be configured to identify data dependencies of ML models. In particular, the dependency information module 212 may analyze the ML model representations 106(1)-(n) for dependencies on the data sources 206(1)-(n), and notify administrators when a ML model may be negatively impacted by an issue at one of the data sources 206(1)-(n). As illustrated in FIG. 2, the dependency information module 212 may include a management module 218 and one or more virtualized environments 220(1)-(n). The management module 218 may be configured to retrieve a ML model representation 106 from a repository 204, and generate a virtualized environment 220 for analyzing one or more ML model representations 106 that have been retrieved. In some examples, the management module 218 may possess security information (e.g., credential, password, security token, and/or certificate) for accessing a repository 204 to retrieve one or more ML model representations 106(1)-(n). Further, the management module 218 may be configured to store data dependency information indicating that a ML model depends on a data source 206, provide the data dependency information to the monitoring module 214, and identify the computing devices 208 that should be notified of a potential issue affecting a data source 206 based on the computing devices 208 being associated with a ML model that depends on the data source 206.

Each virtualized environment 220 may include a ML model dependency extractor 104. For example, the first virtualized environment 220(1) may include the first ML model dependency extractor 104, the nth virtualized environment 220(n) may include the nth ML model dependency extractor 104(n), and so forth. In some examples, the virtualized environment may be a container for executing the ML model dependency extractor 104 as a containerized process. As used herein, in some aspects, a "containerized process" may refer to a software package that contains an application in a complete file system having executable instructions, a runtime environment, system tools, system libraries, and/or other suitable components sufficient to execute the application. Some benefits of containerized applications include ease of use, standardization of execution environment, lightweight execution, and security via isolation. Further, containerized applications running on a single server or virtual machine may share the same operating system kernel and may make efficient use of system or virtual memory. For example, a container may include an application and all of its dependencies, but share the operating system kernel with other containers on the same host. Additionally, or alternatively, in some aspects, a ML model dependency extractor 104 may operate outside and/or without a virtualized environment 220.

The monitoring module 214 may be configured to monitor the status (e.g., health, load, drift, and/or freshness) of the data sources 206(1)-(n). In some aspects, the monitoring module 214 may receive status information 222(1)-(n) indicating the status of the data sources 206(1)-(n). For example, the monitoring module 214 may determine the status of a data source based on status information 222(1) received from the data source 206(1) indicating that that the data source 206(1) is currently unavailable. As another example, the monitoring module 214 may determine the status of a data source 206(2) based on failure to receive status information 222(1) from a data source 206(2), e.g., a heartbeat communication. As yet still another example, the monitoring module 214 may receive status information 222(3) from the data source 206(1), the computing device 208(1), and/or the management module 218 indicating that that the data source 206(1) is stale and no longer reliable.

Further, the monitoring module 214 and/or the management module 218 may be configured to transmit a dependency issue information 224(1)-(n) to the computing devices 208(1)-(n) in response to the monitoring module 214 determining potential issues at the data sources 206(1)-(n). For example, the monitoring module 214 may determine that the data source 206(1) is experiencing one or more issues and transmit an identifier of the data source 206(1) to the management module 218. Further, the management module 218 may determine one or more ML models that have been identified by the ML model dependency extractor 104 as depending on the data source 206(1), identify the computing devices 208(1)-(6) associated with the applications that employ the ML models, and send, to the computing devices 208(1)-(6) (e.g., an administrator devices), dependency issue information 224(1) identifying that the ML models/applications may be negatively impacted by an issue at the data source 206(1).

The presentation module 216 may be configured to provide a data dependency to a computing device 208. For example, the computing device 208(1) may transmit a request 226(1) for dependency extraction of ML models employed by a particular application or script. In response, the management module 218 may retrieve the ML models representations 106(1)-(n) for the ML models of the particular application or script. Further, the ML model dependency extractor 104 may determine the data dependencies of the ML models, and transmit the response 228(1) including the data dependencies to the computing device 208(1). In another example, the computing device 208(2) may transmit a request 226(2) for dependency extraction of ML models employed by a particular application or script. Further, the request 226(2) may include the ML models representations 106(1)-(n) for the ML models of the particular application or script. Further, the ML model dependency extractor 104 may determine the data dependencies of the ML models, and transmit the response 228(2) including the data dependencies to the computing device 208(2).

As illustrated in FIG. 2, in some aspects, the computing devices 208(1)-(n) may include a client application 230 configured to access the dependency information module 212. For example, the client application 230 of the computing device 208(1) may be configured to transmit the requests 226(1) to the dependency information module 212 and receive the responses 228(1) from the presentation module 216. Upon receipt of the response 228(1), a graphical user interface of client application 230 may present the dependencies of the ML models associated with the request via a display device of the computing device 208(1).

Figure 3:
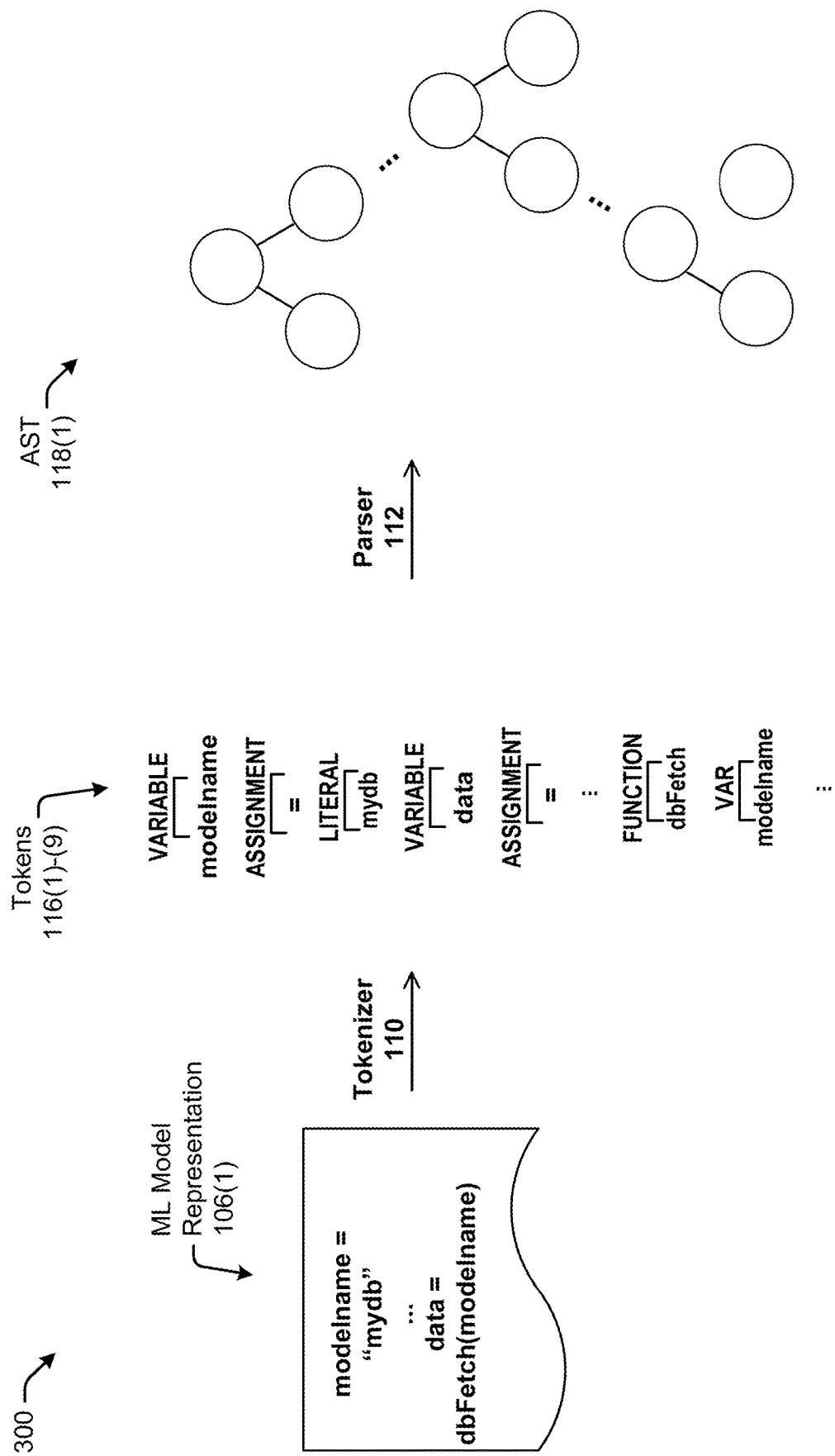
FIG. 3 is a diagram illustrating an example of AST generation, in accordance with some aspects of the present disclosure.

FIG. 3 is a diagram 300 illustrating an example of AST generation, in accordance with some aspects of the present disclosure. As illustrated in FIG. 3, the tokenizer may receive a ML model presentation 106(1) and generate a plurality of tokens 116(1)-(9). Further, the parser 112 may generate an AST 118(1) including a plurality of AST nodes based on the plurality of tokens 116(1)-(9). Further, as described in detail herein, the AST analyzer 114 may be configured to identify a data dependency based upon an attribute of an AST node. For example, an attribute of an AST node may be indicative of use of a data source (e.g., a data source 206(1)) by a ML model. For instance, as illustrated in FIG. 3, one or more AST nodes corresponding to the dbFetch function may indicate a dependency on "mydb."

In an example wherein the ML model is developed using a Python AML, an AST node corresponding to a DataReference object may be indicative of a dependency on a data source. In addition, in some aspects, the AST analyzer 114 may be configured to traverse (e.g., recursively traverse) the AST 118 to identify a data dependency of a ML model. For example, if the data source is a database, the AST analyzer 114 may be configured to traverse the AST 118 to determine the database, a cluster containing the database, the relevant table of the database, and the relevant column of the database.

Example Processes

Figure 4:
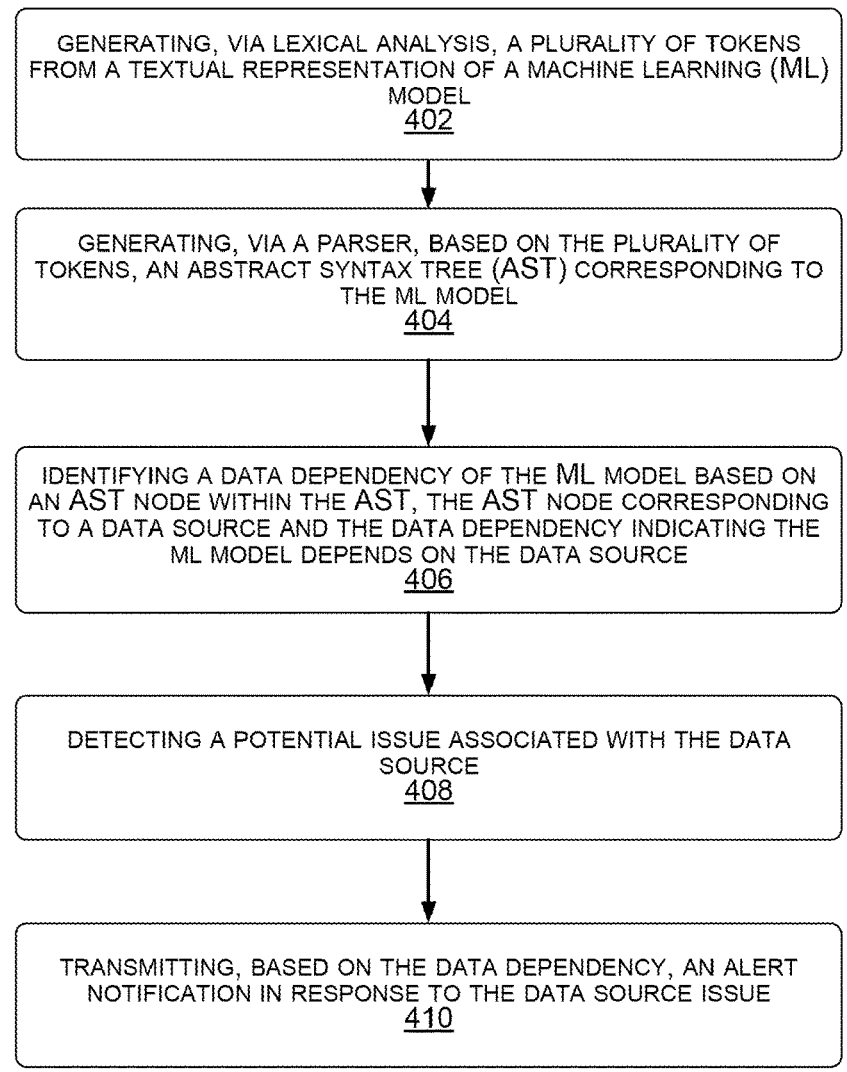
FIG. 4 is a flow diagram illustrating an example method for ML Model dependency management, in accordance with some aspects of the present disclosure.

FIG. 4 is a flow diagram illustrating an example method 400 for implementing anomaly detection, in accordance with some aspects of the present disclosure. The method 400 may be performed by one or more components of the computing device 102, the cloud computing platform 202, the computing device 600, or any device/component described herein according to the techniques described with reference to the previous figures.

At block 402, the method 400 may include generating, via lexical analysis, a plurality of tokens from a textual representation of a machine learning (ML) model. For example, the tokenizer 110 may generate the plurality of tokens 116(1)-(200) based on the ML model representation 106(1).

Accordingly, the computing device 102, the cloud computing platform 202, the dependency information module 212, the computing device 600, and/or the processor 602 executing the tokenizer 110 may provide means for generating, via lexical analysis, a plurality of tokens from a textual representation of a machine learning (ML) model.

At block 404, the method 400 may include generating, via a parser, based on the plurality of tokens, an abstract syntax tree (AST) corresponding to the ML model. For example, the parser 112 may generate the AST 118(1) based on the plurality of tokens 116(1)-(200).

Accordingly, the computing device 102, the cloud computing platform 202, the dependency information module 212, the computing device 600, and/or the processor 602 executing the parser 112 may provide means for generating, via a parser, based on the plurality of tokens, an abstract syntax tree (AST) corresponding to the ML model.

At block 406, the method 400 may include identifying a data dependency of the ML model based on an AST node within the AST, the AST node corresponding to a data source and the data dependency indicating the ML model depends on the data source. For example, the AST analyzer 114 may identify the data dependency of the ML model represented by the ML model representation 106(1) based on the AST 118(1). For example, an AST node of the AST 118(1) may be of a node type corresponding to use of a data source within source code. In some aspects, the AST analyzer 114 may determine the node type to search for within the AST 118(1) based upon code information 120(1) for the programming language used to code the ML model.

Accordingly, the computing device 102, the cloud computing platform 202, the dependency information module 212, the computing device 600, and/or the processor 602 executing the AST analyzer 114 may provide means for identifying a data dependency of the ML model based on an AST node within the AST, the AST node corresponding to a data source and the data dependency indicating the ML model depends on the data source.

At block 408, the method 400 may include detecting a potential issue associated with the data source. For example, the monitoring module 214 may monitor the data source of the data dependency 108(1), and determine an issue at the data source. In some aspects, the monitoring module 214 may determine that there is an issue at the monitoring module 214 based on status information received from the data source.

Accordingly, the computing device 102, the cloud computing platform 202, the dependency information module 212, the computing device 600, and/or the processor 602 executing the monitoring module 214 may provide means for detecting a potential issue associated with the data source.

At block 410, the method 400 may include transmitting, based on the data dependency, an alert notification in response to the potential issue. For example, presentation module 216 may transmit the dependency issue information 224 (i.e., the alert notification) to a user device associated with the ML model based upon the monitoring module identify an issue at the data source.

Accordingly, the computing device 102, the cloud computing platform 202, the dependency information module 212, the computing device 600, and/or the processor 602 executing the presentation module 216 may provide means for transmitting, based on the data dependency, an alert notification in response to the potential issue.

Figure 5:
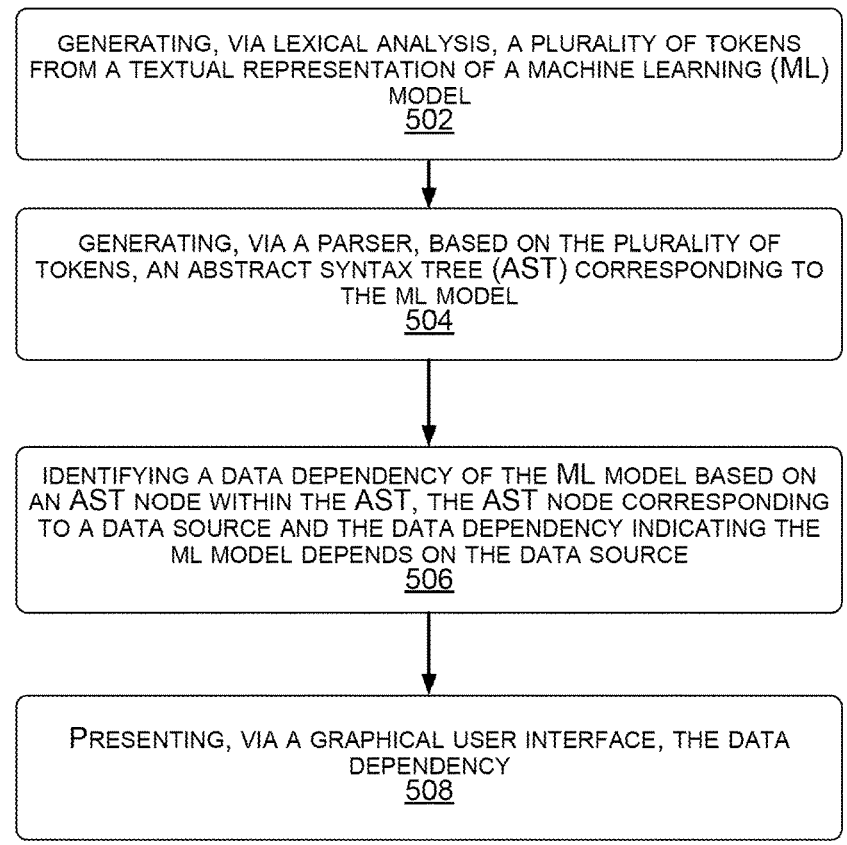
FIG. 5 is a flow diagram illustrating an example method for extracting data dependencies for ML models, in accordance with some aspects of the present disclosure.

FIG. 5 is a flow diagram illustrating an example method 500 for implementing anomaly detection, in accordance with some aspects of the present disclosure. The method 500 may be performed by one or more components of the computing device 102, the cloud computing platform 202, the computing device 600, or any device/component described herein according to the techniques described with reference to the previous figures.

At block 502, the method 500 may include generating, via lexical analysis, a plurality of tokens from a textual representation of a machine learning (ML) model. For example, the tokenizer 110 may generate the plurality of tokens 116(1)-(200) based on the ML model representation 106(1).

Accordingly, the computing device 102, the cloud computing platform 202, the dependency information module 212, the computing device 600, and/or the processor 602 executing the tokenizer 110 may provide means for generating, via lexical analysis, a plurality of tokens from a textual representation of a machine learning (ML) model.

At block 504, the method 500 may include generating, via a parser, based on the plurality of tokens, an abstract syntax tree (AST) corresponding to the ML model. For example, the parser 112 may generate the AST 118(1) based on the plurality of tokens 116(1)-(200).

Accordingly, the computing device 102, the cloud computing platform 202, the dependency information module 212, the computing device 600, and/or the processor 602 executing the parser 112 may provide means for generating, via a parser, based on the plurality of tokens, an abstract syntax tree (AST) corresponding to the ML model.

At block 506, the method 500 may include identifying a data dependency of the ML model based on an AST node within the AST, the AST node corresponding to a data source and the data dependency indicating the ML model depends on the data source. For example, the AST analyzer 114 may identify the data dependency of the ML model represented by the ML model representation 106(1) based on the AST 118(1). For example, an AST node of the AST 118(1) may be of node type corresponding to use of a data source within source code. In some aspects, the AST analyzer 114 may determine the node type to search for within the AST 118 based upon the code information 120(1).

Accordingly, the computing device 102, the cloud computing platform 202, the dependency information module 212, the computing device 600, and/or the processor 602 executing the AST analyzer 114 may provide means for identifying a data dependency of the ML model based on an AST node within the AST, the AST node corresponding to a data source and the data dependency indicating the ML model depends on the data source.

At block 508, the method 500 may include detecting a potential issue associated with the data source. For example, the monitoring module 214 may monitor the data source of the data dependency 108(1), and determine an issue at the data source. In some aspects, the monitoring module 214 may determine that there is an issue at the monitoring module 214 based on status information received from the data source.

Accordingly, the computing device 102, the cloud computing platform 202, the dependency information module 212, the computing device 600, and/or the processor 602 executing the monitoring module 214 may provide means for detecting a potential issue associated with the data source.

In some aspects, the techniques described herein relate to a method, further including serializing the ML model into the textual representation.

In some aspects, the techniques described herein relate to a method, wherein the AST is a first AST node, and identifying the data dependency of the ML model includes: identifying a second AST node corresponding to a component of the data source; and recursively traversing, in response to identifying the second AST node, the AST to identify the first AST node corresponding to the data source.

In some aspects, the techniques described herein relate to a method, wherein identifying the data dependency of the ML model includes identifying the data dependency of the ML model based on a node type of the AST node.

In some aspects, the techniques described herein relate to a method, further including determining a programming language associated with the ML model; and determining the node type associated with the programming language.

In some aspects, the techniques described herein relate to a method, wherein the data source is a database, and the data dependency includes an identifier of the ML model, an identifier of a cluster containing the data source, an identifier of a table of the data source, and/or an identifier of a column of the data source.

In some aspects, the techniques described herein relate to a method, wherein the data source is another ML model.

In some aspects, the techniques described herein relate to a method, wherein the ML model depends on the data source during at least one of a training phase, a validation phase, or an inference phase.

In some aspects, the techniques described herein relate to a method, wherein transmitting, based on the data dependency, the alert notification in response to the data source issue includes identifying, based on the data dependency, an owner of the ML model in response to the data source issue; and transmitting the alert notification to a device associated with the owner of the ML model.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 6:
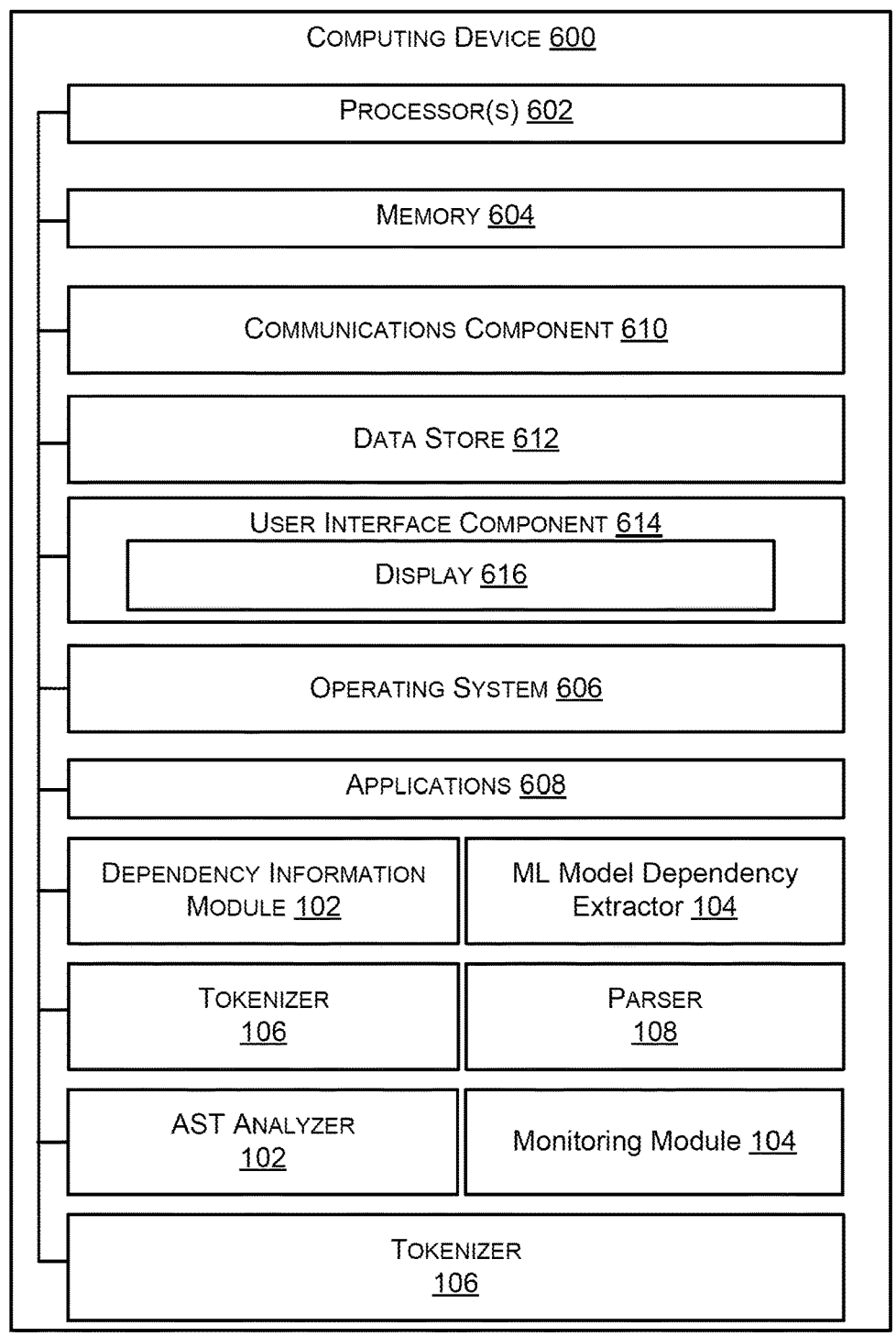
FIG. 6 is a block diagram illustrating an example of a hardware implementation for a computing device(s), in accordance with some aspects of the present disclosure.

Referring now to FIG. 6, an example of a computing device(s) 600 (e.g., the computing device 102, the cloud computing platform 202, the one or more repositories 204, the one or more data sources 206, and the one or more computing devices 208). In one example, the computing device(s) 600 includes the processor 602 for carrying out processing functions associated with one or more of components and functions described herein. The processor 602 can include a single or multiple set of processors or multi-core processors. Moreover, the processor 602 may be implemented as an integrated processing system and/or a distributed processing system. In an example, the processor 602 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 602 may include other processing components such as one or more arithmetic logic units (ALUs), registers, or control units.

In an example, the computing device 600 also includes memory 604 for storing instructions executable by the processor 602 for carrying out the functions described herein. The memory 604 may be configured for storing data and/or computer-executable instructions defining and/or associated with the ML model representations 106, the data dependencies 108, the plurality of tokens 116, the ASTs 118, the code information 120, the requests 226(1)-(n), the responses 228(1)-(n), and the status information 222(1)-(n), and the processor 602 may execute the dependency information module 212, the ML model dependency extractor 104, the tokenizer 110, the parser 112, the AST analyzer 114, the management module 218, the monitoring module 214, the presentation module 216, and the virtualized environment 220. An example of memory 604 may include, but is not limited to, a type of memory usable by a computer, such as random access memory (RAM), read only memory (ROM), tapes, magnetic discs, optical discs, volatile memory, non-volatile memory, and any combination thereof. In an example, the memory 604 may store local versions of applications being executed by processor 602.

The example computing device 600 may include a communications component 610 that provides for establishing and maintaining communications with one or more parties utilizing hardware, software, and services as described herein. The communications component 610 may carry communications between components on the computing device 600, as well as between the computing device 600 and external devices, such as devices located across a communications network and/or devices serially or locally connected to the computing device 600. For example, the communications component 610 may include one or more buses, and may further include transmit chain components and receive chain components associated with a transmitter and receiver, respectively, operable for interfacing with external devices.

The example computing device 600 may include a data store 612, which may be any suitable combination of hardware and/or software, that provides for mass storage of information, databases, and programs employed in connection with implementations described herein. For example, the data store 612 may be a data repository for the operating system 606 and/or the applications 608.

The example computing device 600 may include a user interface component 414 operable to receive inputs from a user of the computing device 600 and further operable to generate outputs for presentation to the user. The user interface component 614 may include one or more input devices, including but not limited to a keyboard, a number pad, a mouse, a touch-sensitive display (e.g., display 616), a digitizer, a navigation key, a function key, a microphone, a voice recognition component, any other mechanism capable of receiving an input from a user, or any combination thereof. Further, the user interface component 614 may include one or more output devices, including but not limited to a display (e.g., display 616), a speaker, a haptic feedback mechanism, a printer, any other mechanism capable of presenting an output to a user, or any combination thereof.

In an implementation, the user interface component 614 may transmit and/or receive messages corresponding to the operation of the operating system 606 and/or the applications 608. In addition, the processor 602 executes the operating system 606 and/or the applications 608, and the memory 604 or the data store 612 may store them.

Further, one or more of the subcomponents of the computing device 102, the cloud computing platform 202, the dependency information module 212, the ML model dependency extractor 104, the tokenizer 110, the parser 112, the AST analyzer 114, the management module 218, the monitoring module 214, the presentation module 216, and the virtualized environment 220, may be implemented in one or more of the processor 602, the applications 608, the operating system 606, and/or the user interface component 614 such that the subcomponents of the computing device 102, the cloud computing platform 202, the dependency information module 212, the ML model dependency extractor 104, the tokenizer 110, the parser 112, the AST analyzer 114, the management module 218, the monitoring module 214, the presentation module 216, and the virtualized environment 220 are spread out between the components/subcomponents of the computing device 600.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Non-transitory computer-readable media excludes transitory signals. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method comprising:
generating, via lexical analysis, a plurality of tokens from a textual representation of a machine learning (ML) model;
generating, via a parser, based on the plurality of tokens, an abstract syntax tree (AST) corresponding to the ML model;
identifying a data dependency of the ML model based on an AST node within the AST, the AST node corresponding to a data source and the data dependency indicating the ML model depends on the data source;
detecting, based on monitoring the data source indicated by the data dependency, a potential issue associated with the data source; and
transmitting, based on the data dependency, an alert notification in response to the potential issue.

2. The method of claim 1, wherein the AST is a first AST node, and identifying the data dependency of the ML model comprises:
identifying a second AST node corresponding to a component of the data source; and
recursively traversing, in response to identifying the second AST node, the AST to identify the first AST node corresponding to the data source.

3. The method of claim 1, wherein identifying the data dependency of the ML model comprises identifying the data dependency of the ML model based on a node type of the AST node.

4. The method of claim 3, further comprising:
determining a programming language associated with the ML model; and
determining the node type associated with the programming language.

5. The method of claim 1, wherein the data source is a database, and the data dependency includes an identifier of the ML model, an identifier of a cluster containing the data source, an identifier of a table of the data source, and/or an identifier of a column of the data source.

6. The method of claim 1, wherein the data source is another ML model.

7. The method of claim 1, wherein the ML model depends on the data source during at least one of a training phase, a validation phase, or an inference phase.

8. The method of claim 1, wherein transmitting, based on the data dependency, the alert notification comprises:
identifying, based on the data dependency, an owner of the ML model in response to detecting the potential issue; and
transmitting the alert notification to a device associated with the owner of the ML model.

9. A non-transitory computer-readable device having instructions thereon that, when executed by at least one computing device, cause the at least one computing device to perform operations comprising:

generating, via lexical analysis, a plurality of tokens from a textual representation of a machine learning (ML) model;

generating, via a parser, based on the plurality of tokens, an abstract syntax tree (AST) corresponding to the ML model;

identifying a data dependency of the ML model based on an AST node within the AST, the AST node corresponding to a data source and the data dependency indicating the ML model depends on the data source;

detecting, based on monitoring the data source indicated by the data dependency, a potential issue associated with the data source; and transmitting, based on the data dependency, an alert notification in response to the potential issue.

10. The non-transitory computer-readable device of claim 9, wherein the AST is a first AST node, and identifying the data dependency of the ML model comprises:

identifying a second AST node corresponding to a component of the data source; and recursively traversing, in response to identifying the second AST node, the AST to identify the first AST node corresponding to the data source.

11. The non-transitory computer-readable device of claim 9, wherein identifying the data dependency of the ML model comprises identifying the data dependency of the ML model based on a node type of the AST node.

12. The non-transitory computer-readable device of claim 11, wherein the instructions thereon that, when executed by at least one computing device, cause the at least one computing device to perform operations further comprising:

determining a programming language associated with the ML model; and determining a node type associated with the programming language.

13. The non-transitory computer-readable device of claim 9, wherein the data source is a database, and the data dependency includes an identifier of the ML model, an identifier of a cluster containing the data source, an identifier of a table of the data source, and/or an identifier of a column of the data source.

14. The non-transitory computer-readable device of claim 9, wherein the data source is another ML model.

15. The non-transitory computer-readable device of claim 9, wherein the ML model depends on the data source during at least one of a training phase, a validation phase, or an inference phase.

16. A system comprising:

a memory storing instructions thereon; and at least one processor coupled with the memory and configured by the instructions to:

generate, via lexical analysis, a plurality of tokens from a textual representation of a machine learning (ML) model;

generate, via a parser, based on the plurality of tokens, an abstract syntax tree (AST) corresponding to the ML model;

identify a data dependency of the ML model based on an AST node within the AST, the AST node corresponding to a data source and the data dependency indicating the ML model depends on the data source;

presenting, via a graphical user interface, the data dependency;

detecting, based on monitoring the data source indicated by the data dependency, a potential issue associated with the data source; and transmitting, based on the data dependency, an alert notification in response to the potential issue.

17. The system of claim 16, wherein the AST is a first AST node, and to identify the data dependency of the ML model comprises:

identifying a second AST node corresponding to a component of the data source; and recursively traversing, in response to identifying the second AST node, the AST to identify the first AST node corresponding to the data source.

18. The system of claim 16, wherein identifying the data dependency of the ML model comprises identifying the data dependency of the ML model based on a node type of the AST node.

19. The system of claim 16, wherein the data source is a database, and the data dependency includes an identifier of the ML model, an identifier of a cluster containing the data source, an identifier of a table of the data source, and/or an identifier of a column of the data source.

20. The system of claim 16, wherein the data source is another ML model.

* * * * *